United States Patent [19]
Miyano

[11] Patent Number: 5,758,554
[45] Date of Patent: Jun. 2, 1998

[54] MACHINE TOOL AND METHOD FOR MACHINING A LONG-SHAFTED WORKPIECE

[76] Inventor: Toshiharu Tom Miyano, c/o Miyano Machinery USA Inc., 940 N. Central Ave., Wood Dale, Ill. 60191

[21] Appl. No.: 759,467

[22] Filed: Dec. 5, 1996

[51] Int. Cl.$^6$ .................................................. B23B 1/00
[52] U.S. Cl. ........................ 82/1.11; 82/121; 82/129
[58] Field of Search ...................... 82/1.11, 121, 127, 82/124, 129, 142

[56] References Cited

U.S. PATENT DOCUMENTS

| | | | |
|---|---|---|---|
| 4,953,274 | 9/1990 | Rehage | 82/129 |
| 5,127,140 | 7/1992 | Oiwa | 82/121 |
| 5,152,201 | 10/1992 | Izawa | 82/1.11 |
| 5,471,900 | 12/1995 | Corwin | 82/1.11 |
| 5,490,307 | 2/1996 | Link | 82/121 |

*Primary Examiner*—A. L. Pitts
*Assistant Examiner*—Mark Williams
*Attorney, Agent, or Firm*—Wood, Phillips, Van Santen, Clark & Mortimer

[57] ABSTRACT

A machine tool for machining a workpiece having a long shaft section. The machine tool includes a frame, a tool holder on the frame for holding the cutting tool to machine a workpiece, a first slide assembly and a first servo motor on the frame for translating the tool holder along a first axis relative to the frame, a second slide assembly on the frame for mounting the tool holder for translation along a second axis relative to the frame, a first workpiece holder on the frame for holding the workpiece to be machined by a cutting tool held in the tool holder, a second workpiece holder on the frame for holding a workpiece to be machined by a cutting tool held in the tool holder, a third slide assembly and a second servo motor for translating the second workpiece holder along the second axis, and structure for selectively connecting the tool holder to the second workpiece holder for translation of the tool holder by the third slide assembly and the second servo motor along the second axis.

17 Claims, 7 Drawing Sheets

MACHINE TOOL AND METHOD FOR MACHINING A LONG-SHAFTED WORKPIECE

FIELD OF THE INVENTION

This invention relates to machine tools and, more particularly, to machine tools for machining a workpiece having a long shaft.

BACKGROUND OF THE INVENTION

Machine tools for machining workpiece having a long shaft section, such as a torsion bar or a steering linkage, are known in the art. Typically, such machine tools are NC turning lathes having four or more axes. More specifically, such lathes normally have a centrally-located workpiece spindle rotatably mounting a pair of chucks on opposite sides of the spindle, with each chuck having a dedicated X axis slide assembly and Z axis slide assembly for translating a tool holder relative to a workpiece held in the chuck. Each of the four slide assemblies has a dedicated servo motor for translating the slide along its axis.

These lathes typically require at least four steps to make a single long-shafted workpiece. First, a separate machine tool is used to cut a workpiece from a length of material bar stock. Second, the workpiece is mounted in the centrally-located spindle, with each end of the workpiece extending from one of the chucks. Third, each end of the workpiece is machined by a cutting tool manipulated by the X and Z axes slide assemblies dedicated to each chuck. Fourth, the finished workpiece is removed from the NC lathe.

Thus, it can be seen that conventional practice requires not only an NC lathe having at least four axes with a dedicated slide assembly and servo motor for each axis, but also a separate machine tool for cutting the initial workpiece to length from a length of material bar stock.

Summary of the Invention

In accordance with the present invention, a machine tool is provided for machining a workpiece having a long shaft section. The machine tool includes a frame, a tool holder on the frame for holding a cutting tool to machine a workpiece, a first slide assembly and a first servo motor on the frame for translating the tool holder along a first axis relative to the frame, a second slide assembly on the frame for mounting the tool holder for translation along a second axis relative to the frame, a first workpiece holder on the frame for holding a workpiece to be machined by a cutting tool held in the tool holder, a second workpiece holder on the frame for holding a workpiece to be machined by a cutting tool held in the tool holder, a third slide assembly and a second servo motor for translating the second workpiece holder along the second axis, and structure for selectively connecting the tool holder to the second workpiece holder for translation of the tool holder by the third slide assembly and the second servo motor along the second axis.

In one form, the first workpiece holder includes a rotatable element for driving the workpiece as it is machined by a cutting tool, and the second workpiece holder includes a second rotatable element for driving the workpiece as it is machined by a cutting tool. In one form, the tool holder is a turret holding a plurality of cutting tools.

In one form, the structure for selectively connecting the first tool holder to the second workpiece holder includes an aperture in one of the first tool holder, the first slide assembly, and the second slide assembly; a lock pin carried on one of the second workpiece holder and the third slide assembly; and a servo carried on the one of the tool holder and the third slide assembly for selectively extending the lock pin into engagement with the aperture.

In one form, the machine tool further includes structure on the frame for selectively fixing the second slide assembly to the frame to prevent translation of the first tool holder along the second axis.

In one form, the machine tool further includes a second tool holder for holding the cutting tool to machine a workpiece.

In one form, a machine tool is provided for machining a workpiece having a long shaft section. The machine tool includes a frame, first structure on the frame for mounting a cutting tool for translation along a first axis and a second axis to machine a workpiece, a first workpiece holder on the frame for holding a workpiece to be machined by a cutting tool mounted by the first structure, a second workpiece holder on the frame for holding a workpiece to be machined by a cutting tool mounted by the first structure, second structure on the frame for translating the second workpiece holder along the second axis, and third structure on the frame for selectively connecting the first structure to the second structure for translation of the first structure by the second structure along the second axis.

In accordance with the present invention, a method for machining a workpiece is provided and includes the steps of providing a workpiece, providing a cutting tool holder for holding the cutting tool to machine the workpiece, providing a first workpiece holder, providing a second workpiece holder that is translatable along a first axis, loading the workpiece into the first workpiece holder, connecting the cutting tool holder to the second workpiece holder, and translating the cutting tool holder and the second workpiece holder together along the first axis while the workpiece is held by the first workpiece holder and machined by a cutting tool held in the cutting tool holder.

In one form, the method further includes the steps of loading the workpiece into the second workpiece holder, fixing the cutting tool holder relative to the first axis, disconnecting the cutting tool holder from the second workpiece holder, and translating the second workpiece holder and the workpiece together along the first axis while the workpiece is held by the second workpiece holder and machined by a cutting tool held in the cutting tool holder.

In accordance with the present invention, a method of processing the workpiece is provided and includes the steps of providing a workpiece, providing a first workpiece holder, providing a second workpiece holder that is translatable along a first axis, holding the workpiece with the first workpiece holder while a first processing operation is performed on the workpiece, releasing the workpiece from the workpiece holder so that the workpiece may move relative to the first workpiece holder, loading the workpiece into the second workpiece holder, and drawing a length of the workpiece through the first workpiece holder while the second workpiece holder is translated along the first axis holding the workpiece.

In one form, the method further includes holding the workpiece with the first workpiece holder after the length has been drawn through the first workpiece holder, releasing the workpiece from the second workpiece holder so that the second workpiece holder may move relative to the workpiece, translating the second workpiece holder along the first axis while the workpiece is held by the first workpiece holder so that at least a portion of the length is translated through the second workpiece holder, and performing a second processing operation on the workpiece holder while the workpiece is held by at least one of the first and second workpiece holders.

DETAILED DESCRIPTION OF THE PREFERRED EMBODIMENTS

Figure 1:
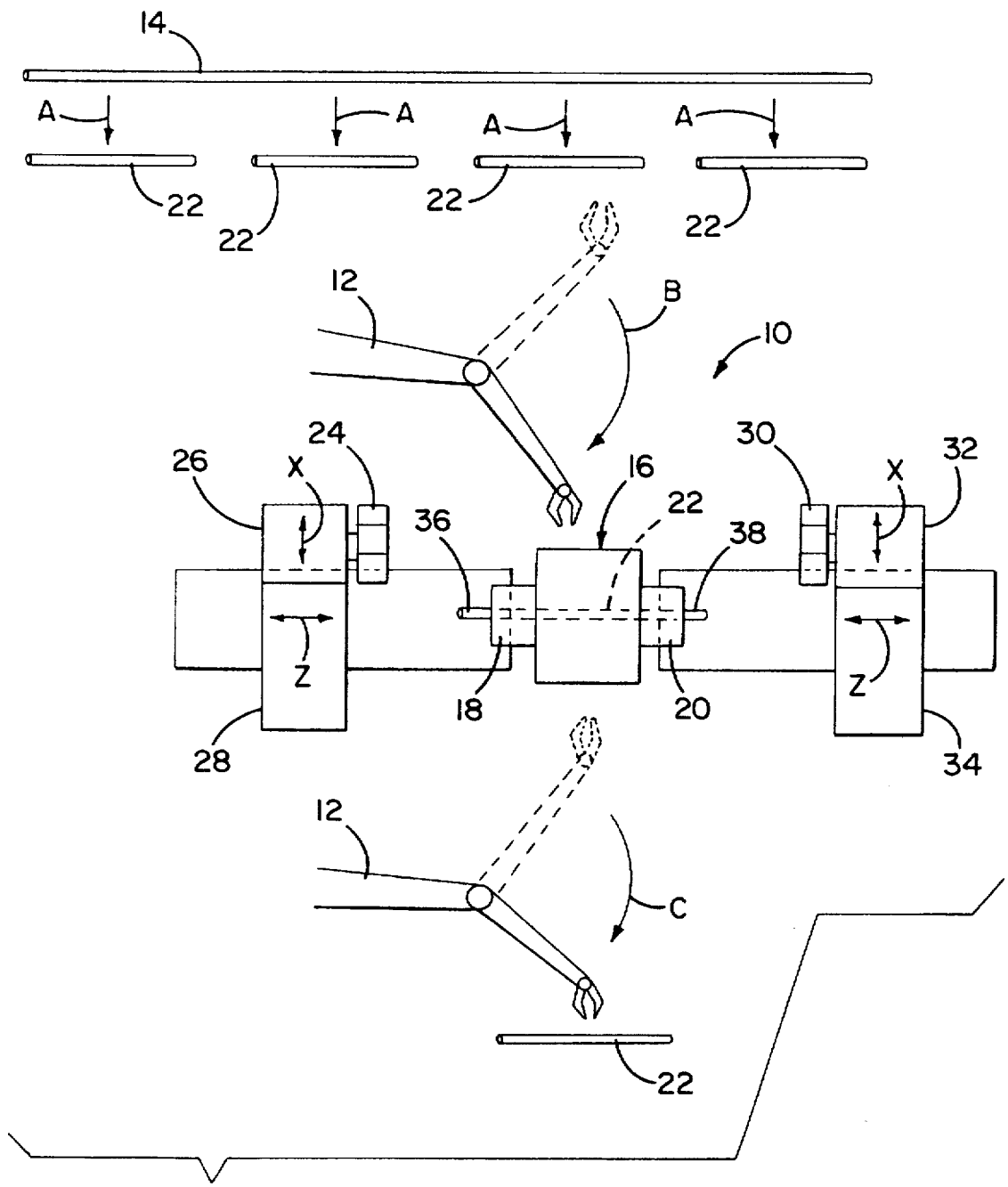
FIG. 1 is a diagrammatic plan view of a conventional machine tool set-up for machining a workpiece having a long shaft section.

A plan view of a conventional machine tool set-up for machining a workpiece having a long shaft section is illustrated in FIG. 1 in the form of a CNC (computer numerical controlled) lathe 10, a robot arm 12, and a length of material bar stock 14. The lathe 10 includes conventional operating components that are well known to those skilled in the art. These operating components include a spindle assembly 16 having a pair of oppositely-projecting chucks 18 and 20 for rotating a workpiece 22, a first turret 24 for holding a plurality of cutting tools (not shown), a first pair of X and Z axis slide assemblies 26 and 28 for moving the first turret 24 and thereby manipulating a cutting tool held by the turret 24 relative to the workpiece 22 as the workpiece is rotated in the chuck 18, a second turret 30 for holding a plurality of cutting tools (not shown), and a second set of X and Z axis slide assemblies 32 and 34 for moving the first turret 24 and thereby manipulating a cutting tool held by the turret 30 relative to the workpiece 22 as it is rotated in the chuck 20. Each of the slide assemblies 26, 28, 32 and 34 has a dedicated servo motor 35 for translating the slide assembly along its axis.

In the conventional process, a bar-feeding machine (not shown) feeds a length of material bar stock 14 into a cutting machine (not shown) wherein a plurality of workpieces 22 are cut to length, as illustrated by the lines A in FIG. 1. As they are cut to length, the workpieces 22 are loaded into the lathe 10 by the robot arm 12 or by an operator, as illustrated by line B. After a workpiece 22 is loaded into the lathe 10, both ends 36 and 38 of the workpiece 22 are machined by the operating components 18, 24, 26 and 28, and 20, 30, 32, and 34, respectively. After the machining of a workpiece 22 has been completed, the workpiece 22 may be removed from the lathe 10 by the robot arm 12 or by an operator, as illustrated by line C.

Having described a conventional machine tool 10 for machining a workpiece 22 having a long shaft section, the preferred embodiments of the invention will now be described.

Figure 2A:
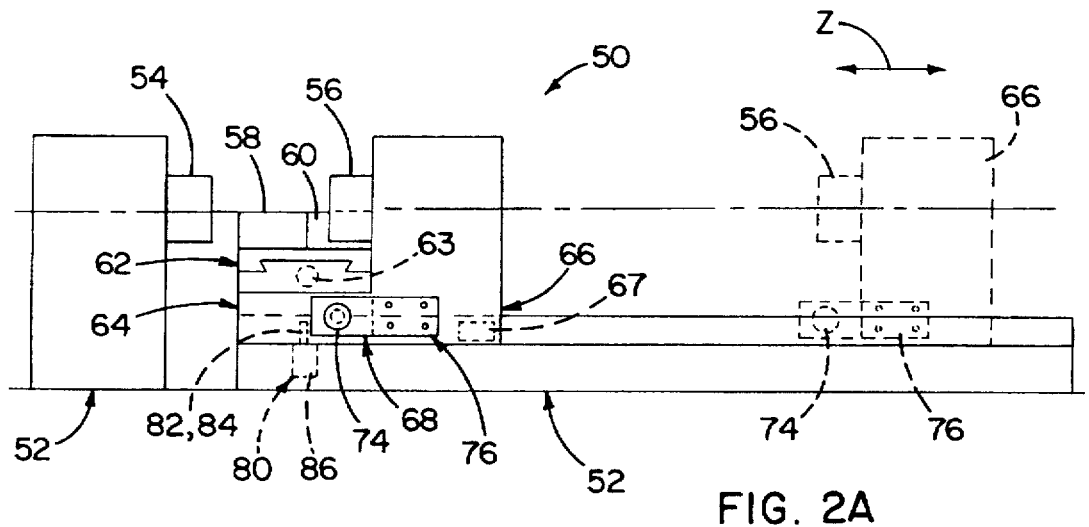
FIG. 2A is a diagrammatic front elevation view of a machine tool embodying the present invention.
Figure 2C:
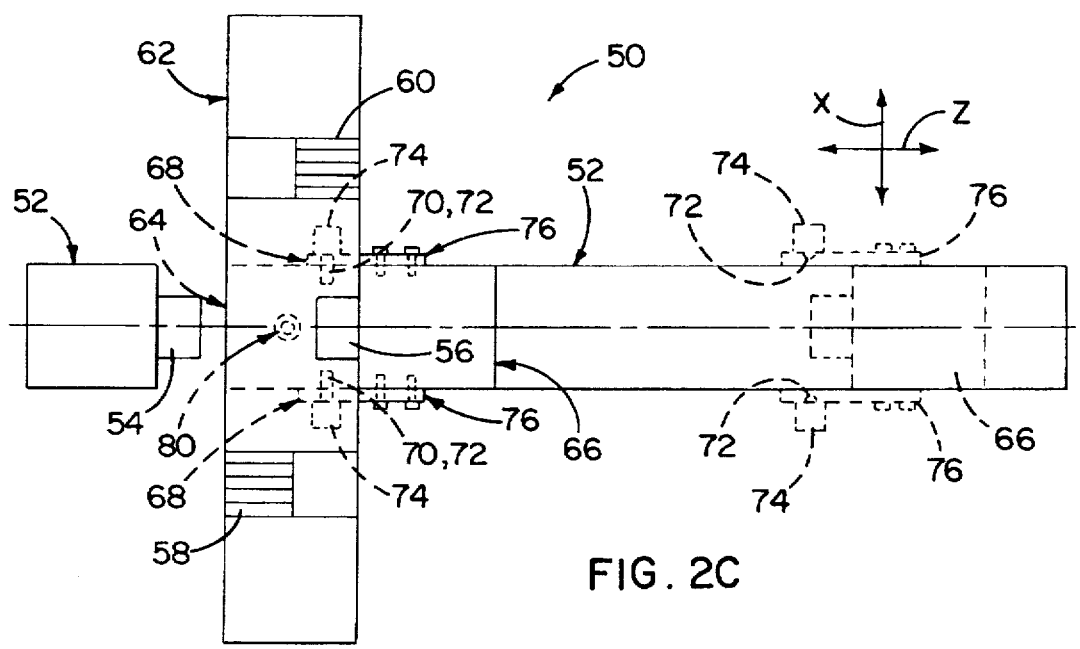
FIG. 2C is a diagrammatic plan view of the machine tool shown in FIG. 2A.
Figure 2B:
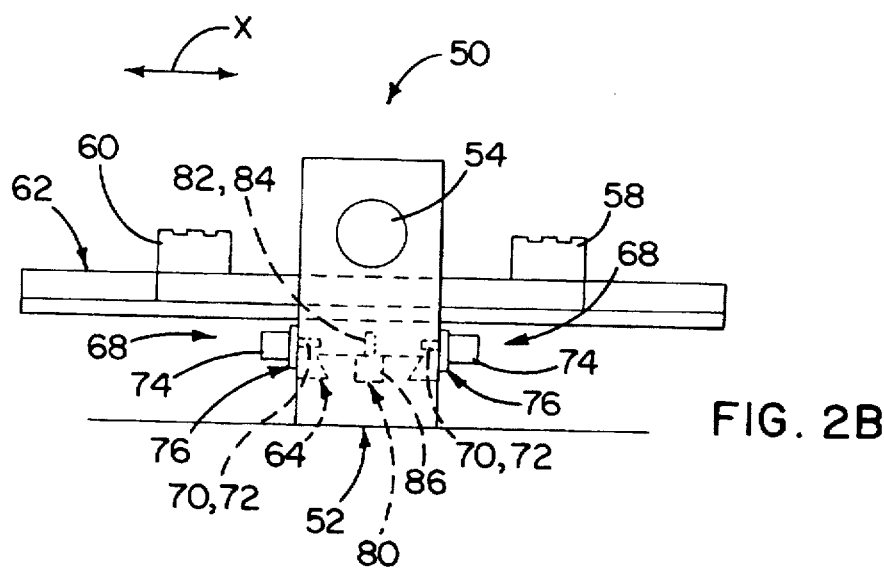
FIG. 2B is a diagrammatic left side elevation view of the machine tool shown in FIG. 2A.
Figure 3A:
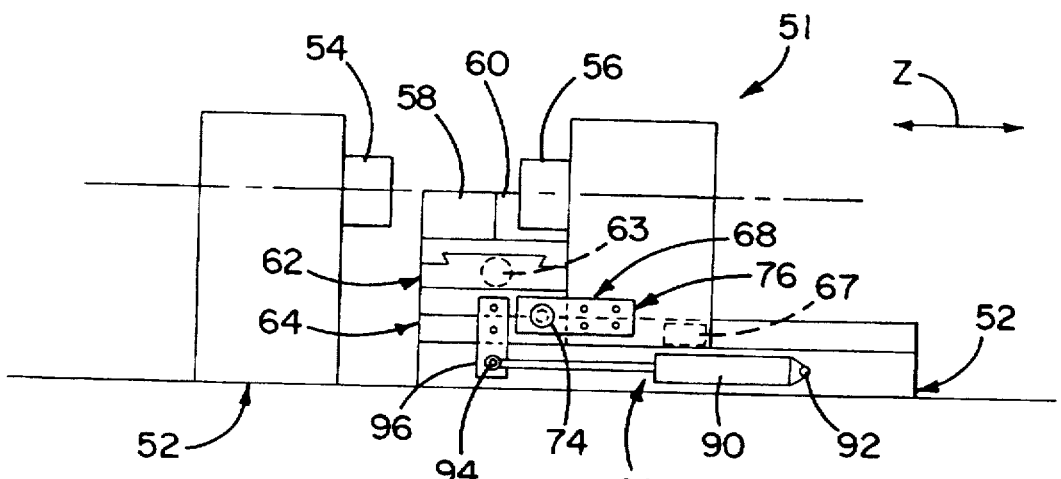
FIG. 3A is a diagrammatic front elevation view of another machine tool embodying the present invention.
Figure 3B:
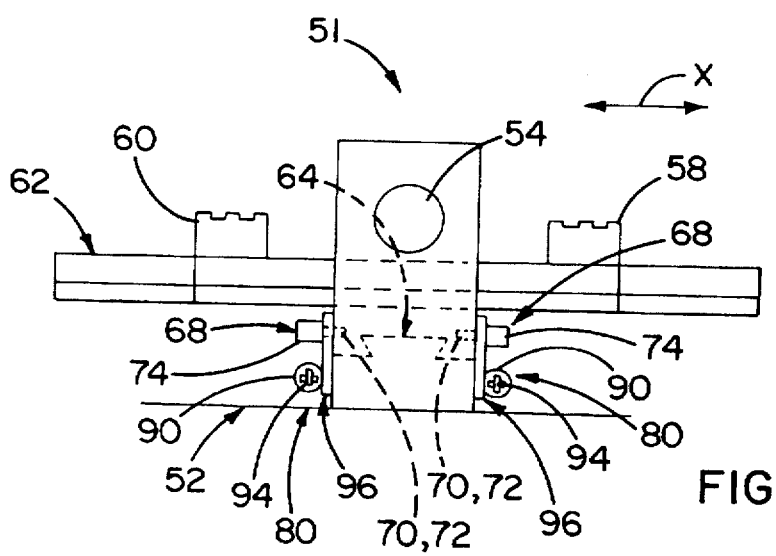
FIG. 3B is a diagrammatic left side elevation view of the machine tool shown in FIG. 3A.
Figure 3C:
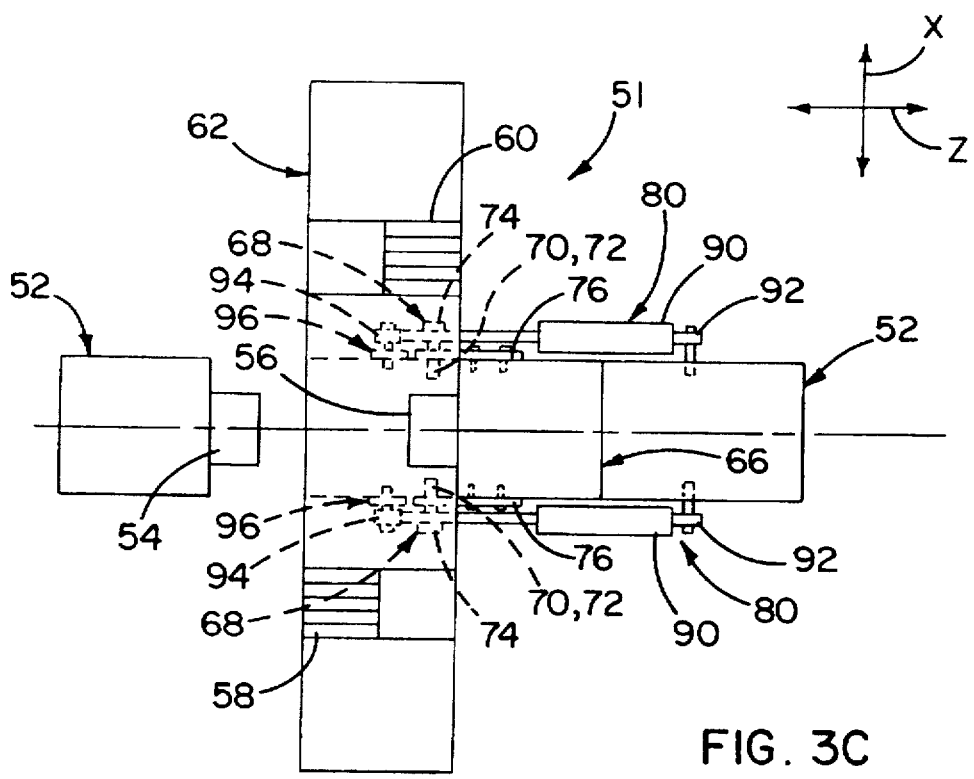
FIG. 3C is a diagrammatic plan view of the machine tool shown in FIG. 3A.

The invention is embodied in a machine tool 50 shown in FIGS. 2A, 2B, and 2C and a machine tool 51 shown in FIGS. 3A, 3B, and 3C, with both of the machine tools 50 and 51 illustrated in the form of a CNC lathe. The machine tool 50 includes a frame, shown generally at 52, a first rotatable element or chuck 54 mounted on the frame for driving a workpiece as it is machined by a cutting tool, a second rotatable element or chuck 56 mounted on the frame for driving a workpiece as it is machined by a cutting tool, a first tool holder 58, a second tool holder 60, an X axis slide assembly 62 and a dedicated actuator or servo motor 63 for translating the first and second tool holders 58 and 60 along the X axis relative to the frame 52, a first Z axis slide assembly 64 for mounting the X axis slide assembly 62 and the tool holders 58 and 60 for translation along the Z axis relative to the frame, and a second Z axis slide assembly 66 and a dedicated actuator or servo motor 67 for translating the chuck 56 along the Z axis relative to the frame. The chucks 54 and 56, the tool holders 58 and 60, the slide assemblies 62, 64 and 66, and the dedicated actuators or servo motors 63 and 67 are conventional operating components and may be any of the types known to those skilled in the art.

The lathe 50 further includes means, shown generally at 68, for selectively connecting the second Z axis slide assembly 66 to the first Z axis slide assembly 64, the X axis slide assembly 62 and its dedicated servo motor, and the tool holders 58 and 60, so that each follows movement of the other along the Z axis. The connecting means 68 is shown in the form of a pair of apertures 70 in the first Z axis slide assembly 64 and a pair of lock pins 72 mounted on the second Z axis slide assembly 66. Each of the lock pins 72 is actuated into and out of engagement with the apertures 70 by a servo 74 fixed to the second Z axis slide assembly 66 by a bracket and fastener assembly 76. The apertures 70 and the lock pins 72 may desirably be any of the self-centering configurations known to those skilled in the art, such as a conical hole and a conical mating pin.

The machine tools 50 and 51 further include means, shown generally at 80 in FIGS. 2A, 2B and 2C and in FIGS. 3A, 3B and 3C on the frame 52 for selectively fixing the first Z axis slide assembly 64 to the frame 52 to prevent translation along the Z axis of the first Z axis slide assembly 64, the X axis slide assembly 62, the servo motor 63, and the tool holders 58 and 60. In the machine tool 50, the fixing means 80 is shown in FIGS. 2A–C in the form of an aperture 82 in the first Z axis slide assembly 64 and a lock pin 84 mounted on the frame 52. A servo 86 mounted on the frame 52 selectively extends the lock pin 84 into and out of engagement with the aperture 82. In the machine tool 51 shown in FIGS. 3A, 3B and 3C, the fixing means 80 is shown in the form of a pair of hydraulic cylinders 90, with each of the cylinders 90 having a first gimbaled end 92 fixed to the frame 52 and a second gimbaled end 94 fixed by a bracket and fastener assembly 96 to the first Z axis slide assembly 64.

The operation of the machine tools 50 and 51 will now be explained with reference to FIGS. 4A, 4B, 4C, 4D, 4E and 4F which illustrate a method embodying the present invention for manufacturing a workpiece having a long shaft section.

Figure 4A:
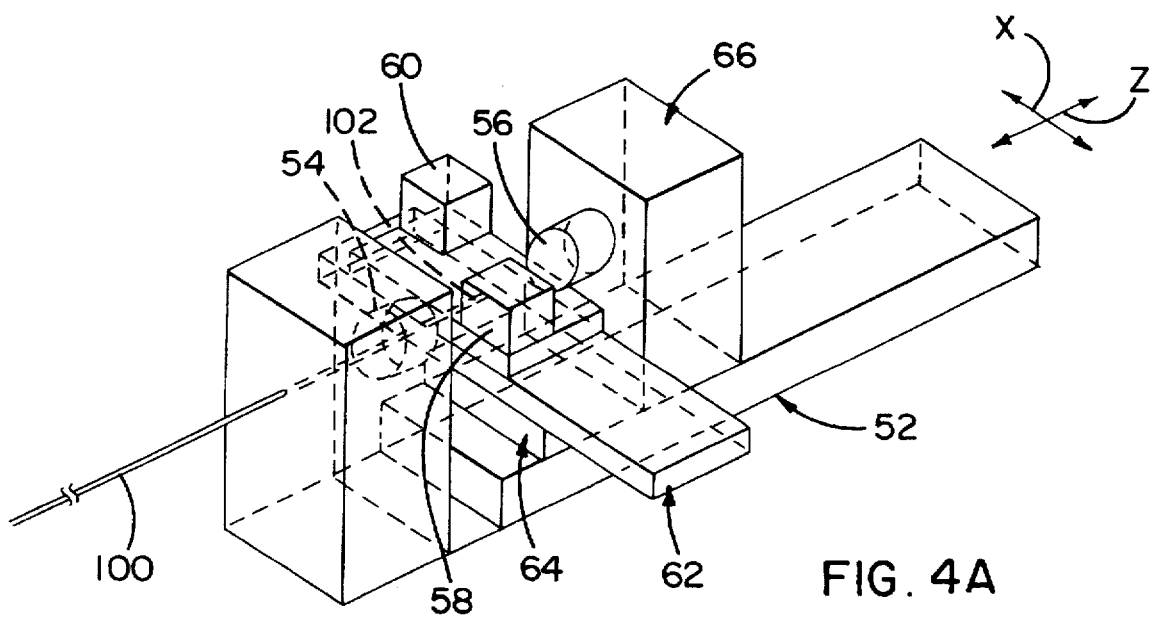
FIGS. 4A, 4B, 4C, 4D, 4E and 4F are diagrammatic perspective views of a machine tool embodying the present invention and illustrating the steps of a machining process embodying the present invention.

As best seen in FIG. 4A, a length of the material bar stock 100 having an end 102 is fed into the first chuck 54 by a conventional bar stock feeding apparatus, as is known in the art. The first and second Z axis slide assemblies 64 and 66 are connected by the connecting means 68 (not shown) with the lock pins 72 extended into the apertures 70 by the servos 74. In this mode, the servo motor 67 associated with the second Z slide assembly 66 can translate the first Z axis slide assembly 64 together with the second Z axis slide assembly 66 to position the slide assemblies 64 and 66 along the Z axis. In this manner, a bar stop tool (not shown) held by either of the tool holders 58,60 is accurately positioned along the Z axis by the servo motor 67 so that the bar stock 100 is stopped after a desired length of bar stock 100 has been fed through the first chuck 54, thereby correctly positioning the bar stock 100 in the first chuck 54.

After correctly positioning the bar stock 100 in the first chuck 54 and tightening the first chuck 54 on the bar stock 100, the machine tools 50,51 machine the first end 102 of the bar stock 100 by rotating the bar stock 100 with the first chuck 54 while machining the end 102 with cutting tools (not shown) that are held by either of tool holders 58,60 and translated along the X axis by the X axis slide assembly 62 and the servo motor 63 (not shown) and along the Z axis by the first and second Z axis slide assemblies 64 and 66 and the servo motor 67 (not shown).

Figure 4B:
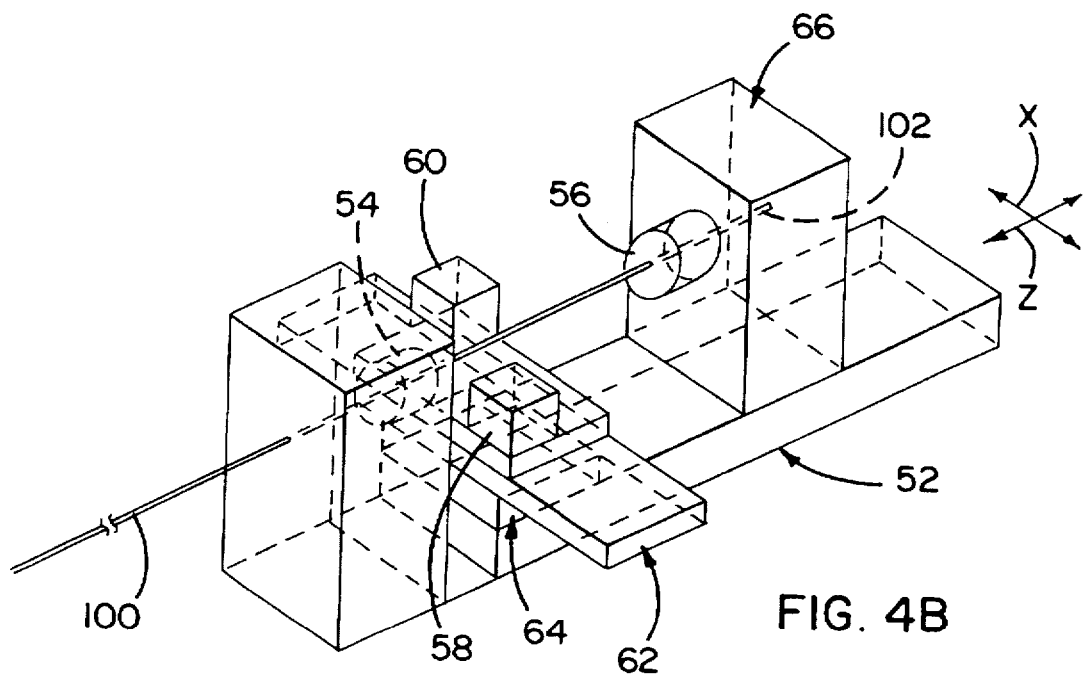

As best seen in FIG. 4B, after the end 102 has been completely machined, the X slide assembly 62 is centered and the first chuck 54 is loosened to allow the bar stock 100 to be fed by the bar stock feeding apparatus into engagement with the second chuck 56. After the bar stock 100 is engaged with the second chuck 56, the connecting means 68 (not shown) releases the first Z axis slide 64 from the second Z axis slide 66 by withdrawing the lock pin 72 from the aperture 70 with the servos 74. Additionally, at this time, the fixing means 80 (not shown) fixes the second Z axis slide assembly 64 to the frame 52 by placing the lock pin 84 into engagement with the aperture 82 using the servo 86 or by energizing the hydraulic cylinders 90 to fix the ends 92 and 94 relative to each other. Next, the second Z axis slide assembly 66 and the servo motor 67 pull a desired length of the bar stock 100 through the first chuck 54 by translating the second chuck 56 to the right along the Z axis.

Figure 4C:
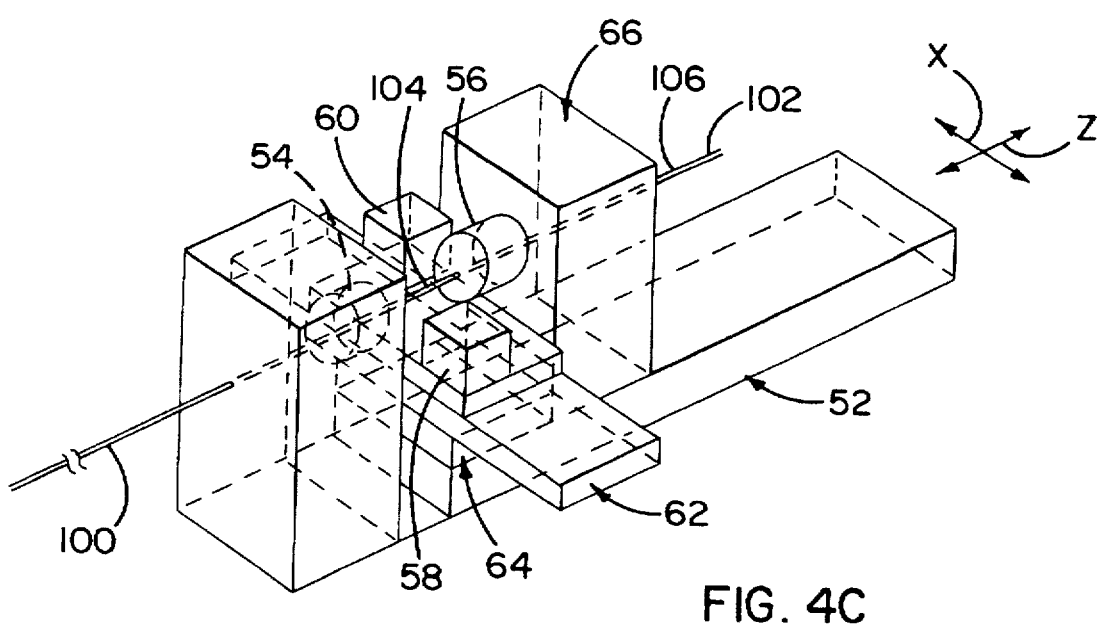

As best seen in FIG. 4C, after the desired length of bar stock 100 is pulled through the first chuck 54, the first chuck 54 is tightened to hold the bar stock 100 and the second chuck 56 is loosened so that the second chuck 56 may be translated by the second Z axis slide assembly 66 and the servo drive 67 along the Z axis until the second chuck 56 is positioned adjacent the tool holders 58 and 60. Then, the second chuck 56 is tightened on the bar stock 100 and, as the bar stock 100 is rotated by the chucks 54 and 56, a cut-off tool (not shown) held by either of the tool holders 59,60 is used to cut through the bar stock 100 to create a second end 104 and an accurately-sized workpiece 106.

Figure 4D:
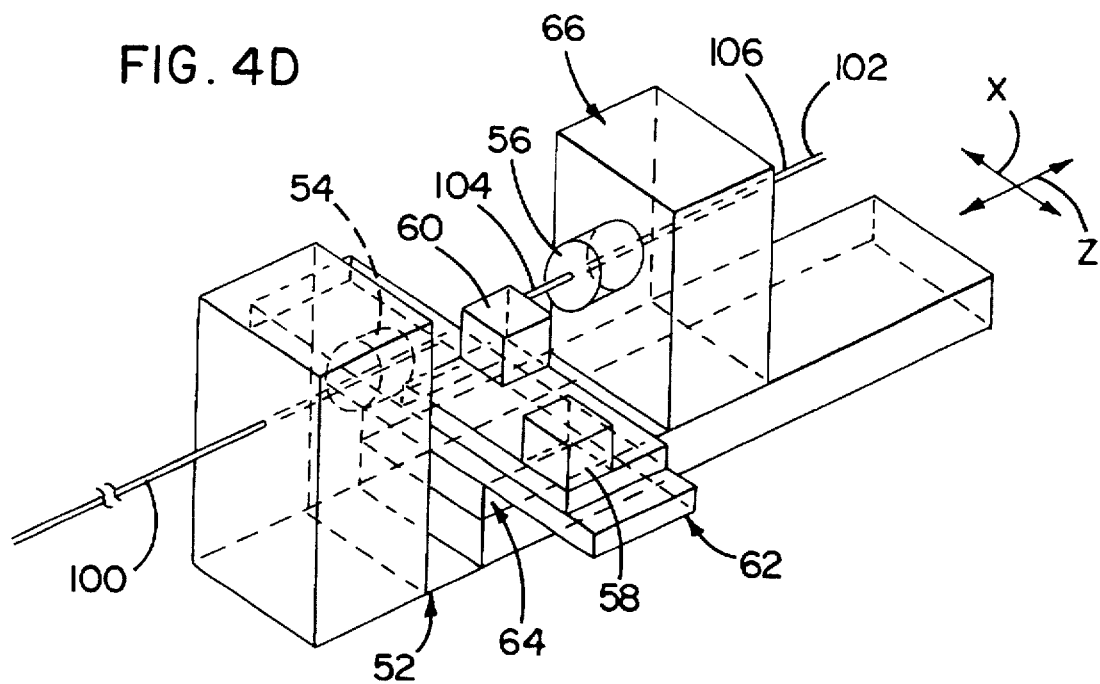

As best seen in FIG. 4D, after the second end 104 and the workpiece 106 have been cut from the bar stock 100, the end 104 of the workpiece 106 is machined by cutting tools (not shown) held in the first and second tool holders 58 and 60. In this mode, X axis translations of the cutting tools relative to the end 104 are provided by the X axis slide 62 and the servo motor 63, while Z axis translations of the cutting tools relative to the end 104 are provided by the second Z axis slide 66 and the servo motor 67 which translate the rotating workpiece 106 and the chuck 56 relative to the first Z axis slide assembly 64, the X axis slide assembly 62, and the tool holders 60 and 58 which are all held stationary relative to the frame in the Z axis by the fixing means 80.

Figure 4E:
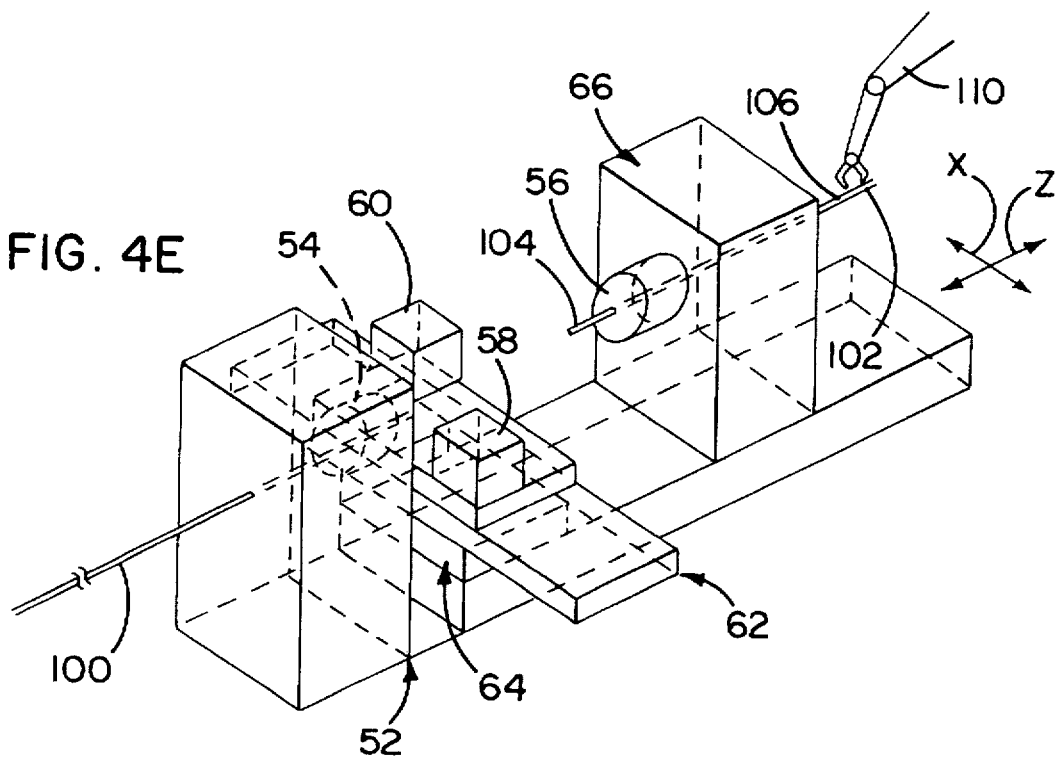
Figure 4F:
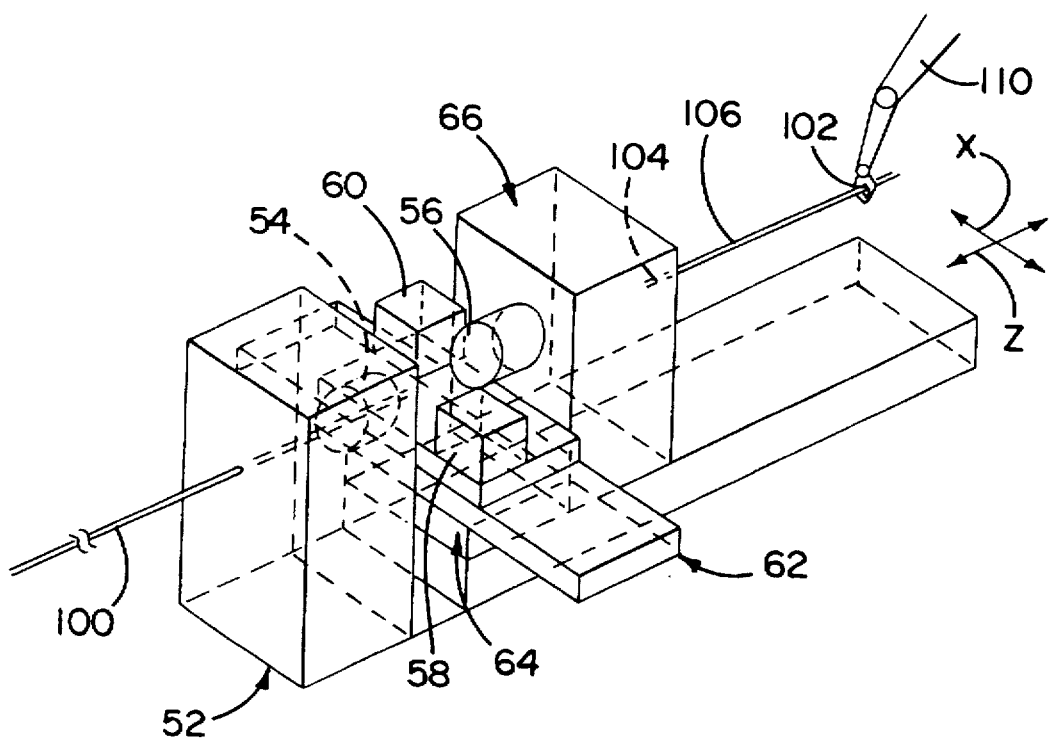

As best seen in FIG. 4E, after the machining of the end 104 has been completed, the workpiece 106 is translated to the right along the Z axis by the second Z axis slide assembly 66 and the servo motor 67 so that the workpiece 106 may be engaged by a robot arm 110. After the robot arm 110 engages the workpiece 106, the second chuck 56 is released from the workpiece 106 and translated to the left along the Z axis by the second Z axis slide assembly 66 and the servo motor 67 to remove the workpiece 106 from the machine tools 50,51 as best seen in FIG. 4F. Alternatively, after the machining of the end 104 has been completed, the workpiece may be removed manually by an operator.

After the workpiece 106 has been removed from the machine tools 50,51, the process outlined above is repeated to create a plurality of workpieces 106.

From the foregoing, it will be appreciated that the disclosed method and apparatus allow for the machining of a workpiece having a long shaft section by a machine tool requiring only three slide assemblies and two servo motors (or other suitable actuators) for translating the slide assemblies. Accordingly, the cost of the machine tools 50,51 may be reduced when compared to the conventional machine tool 10 requiring four axis slide assemblies and four servo motors for translating the axis slide assemblies.

While this invention has been described in terms of the specific embodiments set forth in detail, it will also be appreciated that these are by way of illustration only and that the invention is not necessarily limited thereto. Modifications and variations will be apparent from this disclosure and may be resorted to without departing from the spirit of this invention, as those skilled in the art will readily understand. For example, while the invention has been described in the form of CNC lathes 50 and 51, the invention could be applied equally well to a machine tool which utilizes a rotating cutting tool while the workpiece is held in a nonrotating fashion, and wherein the Z axis translation of the cutting tool relative to the workpiece is provided by a servo drive motor associated with a slide assembly carrying the workpiece holder. Accordingly, such variations and modifications of the disclosed method and apparatus are considered to be within the purview and scope of this invention and the following claims.

CLAIMS

What is claimed is:

1. A machine tool assembly comprising:

a frame;

first means on the frame for holding a cutting tool to machine a workpiece;

second means on the frame for translating the first means along a first axis relative to the frame;

third means on the frame for mounting the first means for translation along a second axis relative to the frame;

fourth means on the frame for holding a workpiece to be machined by a cutting tool held in the first means;

fifth means on the frame for holding a workpiece to be machined by a cutting tool held in the first means;

sixth means on the frame for translating the fifth means along the second axis; and seventh means for selectively connecting the first means to the fifth means for translation of the first means by the sixth means along the second axis.

2. The machine tool of claim 1 wherein said first means is a turret holding a plurality of cutting tools.

3. The machine tool of claim 1 wherein said second means comprises:

a slide assembly carrying the first means; and a servo motor driving the slide assembly.

4. The machine tool of claim 1 wherein said third means is a slide assembly carrying the second means.

5. The machine tool assembly of claim 1 wherein:

the fourth means includes a first rotatable element for driving a workpiece as it is machined by a cutting tool; and the fifth means includes a second rotatable element for driving a workpiece as it is machined by a cutting tool.

6. The machine tool of claim 1 wherein said sixth means comprises:

a slide assembly carrying the fifth means; and a servo motor driving the slide assembly.

7. The machine tool of claim 1 wherein said seventh means comprises:

an aperture in one of the first, second, and third means;

a lock pin carried on one of the fifth and sixth means; and a servo carried on the one of the fifth and sixth means for selectively extending the lock pin into engagement with the aperture.

8. The machine tool of claim 1 further comprising eighth means on the frame for selectively fixing the third means to the frame to prevent translation of the first means along the second axis.

9. The machine tool of claim 8 wherein the eighth means comprises:

an aperture on one of the frame and the third means;

a lock pin carried by the other of the frame and the third means; and a servo carried by the other of the frame and the third means for selectively extending the lock pin into engagement with the aperture.

10. The machine tool of claim 8 wherein the eighth means comprises a hydraulic cylinder having a first end connected to the frame and a second end connected to the third means.

11. The machine tool assembly of claim 1 further comprising ninth means for holding a cutting tool to machine a workpiece.

12. A machine tool assembly comprising:

a frame;

first means on the frame for mounting a cutting tool for translation along a first axis and a second axis to machine a workpiece;

second means on the frame for holding a workpiece to be machined by a cutting tool mounted by the first means;

third means on the frame for holding a workpiece to be machined by a cutting tool translated by the first means;

fourth means on the frame for translating the third means along the second axis; and fifth means on the frame for selectively connecting the first means to the third means for translation of the first means by the fourth means along the second axis.

13. The machine tool assembly of claim 12 wherein:

the first means includes a tool holder, a first slide assembly carrying the tool holder for translation along the first axis, and a second slide assembly carrying the first slide assembly for translation along the second axis; and the fourth means includes a third slide assembly carrying the third means and a servo motor for translating the third slide assembly.

14. A method of machining a workpiece, said method comprising the steps of:

providing a workpiece;

providing a cutting tool holder for holding a cutting tool to machine the workpiece;

providing a first workpiece holder;

providing a second workpiece holder that is translatable along a first axis;

loading said workpiece into said first workpiece holder;

connecting said cutting tool holder to said second workpiece holder; and translating said cutting tool holder and said second workpiece holder together along said first axis while said workpiece is held by said first workpiece holder and machined by a cutting tool held in said cutting tool holder.

15. The method of claim 14 further comprising the steps of:

loading said workpiece into said second workpiece holder;

fixing said cutting tool holder relative to said first axis;

disconnecting said cutting tool holder from said second workpiece holder; and translating said second workpiece holder and said workpiece together along said first axis while said workpiece is held by said second workpiece holder and machined by a cutting tool held in said cutting tool holder.

16. A method of processing a workpiece, said method comprising the steps of:

providing a workpiece;

providing a first workpiece holder;

providing a second workpiece holder that is translatable along a first axis;

holding said workpiece with said first workpiece holder while a first processing operation is performed on said workpiece;

releasing said workpiece from said first workpiece holder so that said workpiece may move relative to said first workpiece holder;

loading said workpiece into said second workpiece holder; and drawing a length of said workpiece through said first workpiece holder while said second workpiece holder is translated along said first axis with the second workpiece holder holding said workpiece.

17. The method of claim 16 further comprising the steps of:

holding said workpiece with said first workpiece holder after said length has been drawn through said first workpiece holder;

releasing said workpiece from said second workpiece holder so that said second workpiece holder may move relative to said workpiece;

translating said second workpiece holder along said first axis while said workpiece is held by said first workpiece holder so that at least a portion of said length is translated through said second workpiece holder; and performing a second processing operation on said workpiece holder while said workpiece is held by at least one of said first and second workpiece holders.

* * * * *